(12) United States Patent
Lee

(10) Patent No.: US 7,783,424 B2
(45) Date of Patent: Aug. 24, 2010

(54) NAVIGATION SYSTEM HAVING FUNCTION OF BRANCH ROAD GUIDANCE BASED ON RUNNING ROAD, AND METHOD THEREOF

(75) Inventor: Soo Sean Lee, Icheon-Si (KR)

(73) Assignee: Hyundai Autonet Co., Ltd., Incheon-Si, Gyeonggi-Do (KR)

( * ) Notice: Subject to any disclaimer, the term of this patent is extended or adjusted under 35 U.S.C. 154(b) by 964 days.

(21) Appl. No.: 11/556,681

(22) Filed: Nov. 3, 2006

(65) Prior Publication Data

US 2007/0208508 A1 Sep. 6, 2007

(30) Foreign Application Priority Data

Nov. 29, 2005 (KR) .................. 10-2005-0114944

(51) Int. Cl.
*G01C 21/00* (2006.01)

(52) U.S. Cl. ....................... 701/213; 340/990

(58) Field of Classification Search ................. 701/201, 701/207–211, 213; 340/990, 995.24
See application file for complete search history.

(56) References Cited

U.S. PATENT DOCUMENTS

| 6,347,280 | B1 * | 2/2002 | Inoue et al. | 701/211 |
|---|---|---|---|---|
| 6,466,867 | B1 * | 10/2002 | Sakashita | 701/211 |
| 6,952,647 | B2 * | 10/2005 | Hasegawa et al. | 701/209 |
| 7,451,044 | B2 * | 11/2008 | Park et al. | 701/210 |

FOREIGN PATENT DOCUMENTS

| JP | 08/201095 | 8/1996 |
|---|---|---|
| JP | 08-241492 | 9/1996 |
| JP | 09-196695 | 7/1997 |
| JP | 10-082651 | 3/1998 |
| JP | 2000-074687 | 3/2000 |
| JP | 2001-050771 | 2/2001 |
| JP | 2001-336944 | 12/2001 |
| JP | 2002-048582 | 2/2002 |
| JP | 2002-236028 | 8/2002 |
| JP | 2004-271466 | 9/2004 |
| JP | 2004-317405 | 11/2004 |
| JP | 2005-140694 | 6/2005 |
| KR | 100247155 | 12/1999 |
| KR | 1020040032371 | 4/2004 |
| KR | 1020060040013 | 5/2006 |

* cited by examiner

*Primary Examiner*—Dalena Tran
(74) *Attorney, Agent, or Firm*—IPLA P.A.; James E. Bame

(57) ABSTRACT

Provided are a navigation system having a function of branch road guidance based on a running road, and a method thereof. The system includes a global positioning system (GPS) module, a map database (DB), a storage unit, a voice processor, and a controller. The GPS module measures a self position. The map DB stores map data comprising road information having a road guide code and an exit code. The storage unit stores road guide codes and exit codes for the running road and a branch road, and stores road guidance voice data, voice data on the branch road, and numeric voice data. The voice processor receives and combines the voice data, and generates and synthesizes branch road guidance voice data. The controller reads the road guide codes for the running road of the measured position and the branch road, and outputs the voice data.

5 Claims, 3 Drawing Sheets

NAVIGATION SYSTEM HAVING FUNCTION OF BRANCH ROAD GUIDANCE BASED ON RUNNING ROAD, AND METHOD THEREOF

CROSS REFERENCE

Applicant claims foreign priority under Paris Convention and 35 U.S.C. §119 to the Korean Patent Application No. 10-2005-0128971, filed Dec. 23, 2005 with the Korean Intellectual Property Office.

BACKGROUND OF THE INVENTION

1. Field of the Invention

The present invention relates to a navigation system, and more particularly, to a navigation system having a function of branch road guidance based on a running road and a method thereof, for outputting a voice for path guidance based on the running road in case where there is an elevated road or an underpass on a front path at the time of the path guidance.

2. Description of the Related Art

In general, a navigation system refers to a system including a global positioning system (GPS) module (receiver) for receiving each position signal from a plurality of GPS satellites and calculating a self position using the position signal. The navigation system maps the calculated self position to previously stored map data, receives destination information from a user, searches a path from the calculated current self position to a destination, and guides a user to the destination along the searched path.

In general, the navigation system is installed in a vehicle, and performs guidance based on a road. At the time of guidance based on the searched path, the navigation system informs, by voice and graphic, the user of a direction to change when it should change the direction at an intersection. Also, the road generally has divergence points where the branch road such as a surface road, an elevated road, or an underpass diverges from the running road. The navigation system outputs a guide voice based on the branch road to be entered, to guide the branch road along the searched path in the divergence point. For example, when the path is on the elevated road, the navigation system outputs a guide voice such as "Enter elevated road" or "Do not enter elevated road".

As described above, the conventional navigation system outputs the guide voice based on the branch road. Therefore, when it does not enter the branch road, there is a drawback that the conventional navigation system can cause a driver's confusion.

SUMMARY OF THE INVENTION

Accordingly, the present invention is directed to a navigation system having a function of branch road guidance based on a running road and a method thereof that substantially overcome one or more of the limitations and disadvantages of the conventional art.

One object of the present invention is to provide a navigation system having a function of branch road guidance based on a running road and a method thereof, for outputting a voice for path guidance based on the running road in case where there is an elevated road or an underpass on a front path at the time of the path guidance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a navigation system having a function of branch road guidance based on a running road. The system includes a global positioning system (GPS) module, a map database (DB), a storage unit, a voice processor, and a controller. The GPS module measures and outputs a self position. The map DB stores map data comprising road information having a road guide code on a per-road basis and an exit code between adjacent roads in a divergence point of a branch road. The storage unit stores, under a predetermined control, road guide codes and exit codes for the running road and the branch road, and stores road guidance voice data, voice data on the branch road, and numeric voice data. The voice processor receives and combines, under a predetermined control, the road guidance voice data, voice data on the road guide code, and the numeric voice data, generates branch road guidance voice data, synthesizes the branch road guidance voice data by voice, and outputs a branch road guide voice. The controller reads, upon detection of the branch road from a front road on a path at the time of path guidance, the road guide codes for the current running road of the measured position and the branch road, stores the read road guide codes in the storage unit, and outputs the voice data on the road guide code and the exit code, the numeric voice data, and the road guidance voice data.

In another aspect of the present invention, there is provided a method for branch road guidance based on a running road in a navigation system. The method includes steps of measuring a current position, and mapping and displaying the measured position; storing a first road guide code for the running road of the measured current position; receiving a destination from a user, searching a path from the current position to the destination, mapping the searched path to map data, and performing guidance; if there is a divergence point in front at the time of road guidance based on the searched path, storing a second road guide code for a branch road that a car enters in the divergence point; calculating an exit code between the running road and the branch road in the divergence point; and guiding the branch road on the basis of the running road by the first road guide code and the second road guide code from a predetermined distance before the divergence point.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
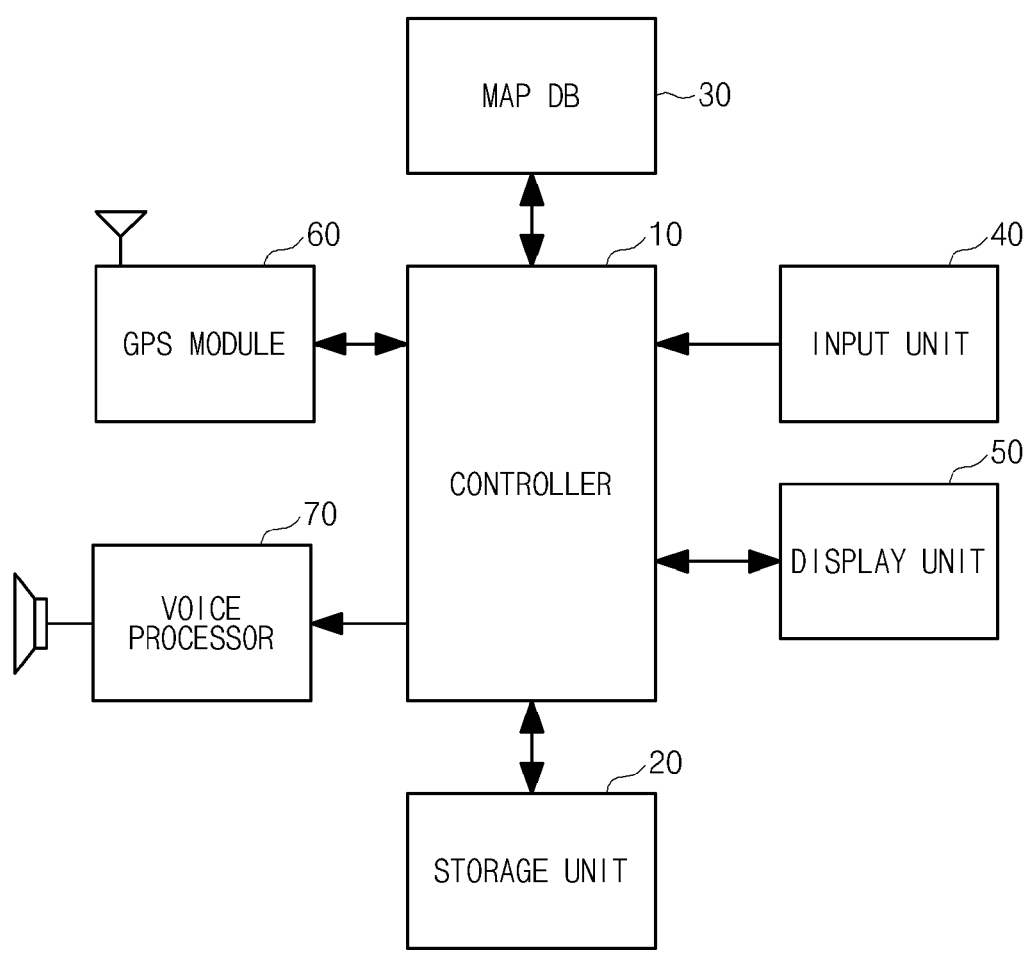
FIG. 1 is a diagram illustrating a construction of a navigation system having a function of path guidance based on a road according to an exemplary embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

According to the present invention, a navigation system performs a voice guidance based on a running road so that a driver can easily recognize an advance direction when meeting a branch road such as an elevated road or an underpass while driving along a searched path. The navigation system magnifies and shows a map displayed on a screen. According to the present invention, the navigation system assigns a road guidance code to map data on a per-branch road basis, and assigns twelve exit codes to provide the voice guidance based on the running road.

The navigation system having a function of branch road guidance based on the running road and a method thereof will be described with reference to the accompanying drawings below.

FIG. 1 is a diagram illustrating a construction of the navigation system having a function of path guidance based on a road according to an exemplary embodiment of the present invention.

The inventive navigation system includes a controller 10, a storage unit 20, a map database (DB) 30, an input unit 40, a display unit 50, a global positioning system (GPS) module 60, and a voice processor 70.

The controller 70 controls a general operation of the navigation system according to the present invention.

The storage unit 20 includes a region for storing a control program for controlling an operation of the navigation system; a region for temporarily storing data generated in execution of the control program; a stack region for storing a road guide code; and a region for storing voice data on an exit code, the road guide code, and a distance, and voice data on road guidance. The voice data on the road guide code can be the elevated road, the underpass, and a surface road. The voice data on the exit code and the distance can be numeric voice data.

The map DB 30 stores map data obtained by mapping information such as whole country topography mapped by latitude and longitude, a road and a building provided on the topography, and names and lot numbers of the road and the building. According to the present invention, road information includes the road guide code on a per-road basis for indicating whether the road is the elevated road, the surface road, or the underpass, and an exit angle between roads in a divergence point where several roads intersect.

The input unit 40 includes a plurality of keys for allowing a user to control the navigation system. The input unit 40 generates data on a key pressed by the user, and outputs the generated key data to the controller 10.

The display unit 50 displays an operation state of the navigation system and the map data under the control of the controller 10, and displays a plurality of information such as an exit code for path progress. The display unit 50 can employ a touch screen. Employing the touch screen, the display unit 50 can be served as an input device independently of or in combination with the input unit 40.

The GPS module 60 includes a gyroscope for measuring the running direction of a vehicle. The GPS module 60 receives position signals from a plurality of GPS satellites, respectively, calculates a self position using the position signals, and outputs the exit code measured by the gyroscope and the calculated position to the controller 10. If so, the controller 10 maps the exit code and the position to the map data of the map DB 30, and displays the mapped exit code and position on the display unit 50.

Under the control of the controller 10, the voice processor 70 combines the road guidance voice data and the distance, road guide code, and exit code voice data outputted from the controller 10, synthesizes the combined voice data by voice, and outputs the synthesized voice data through a speaker (SP).

Figure 2:
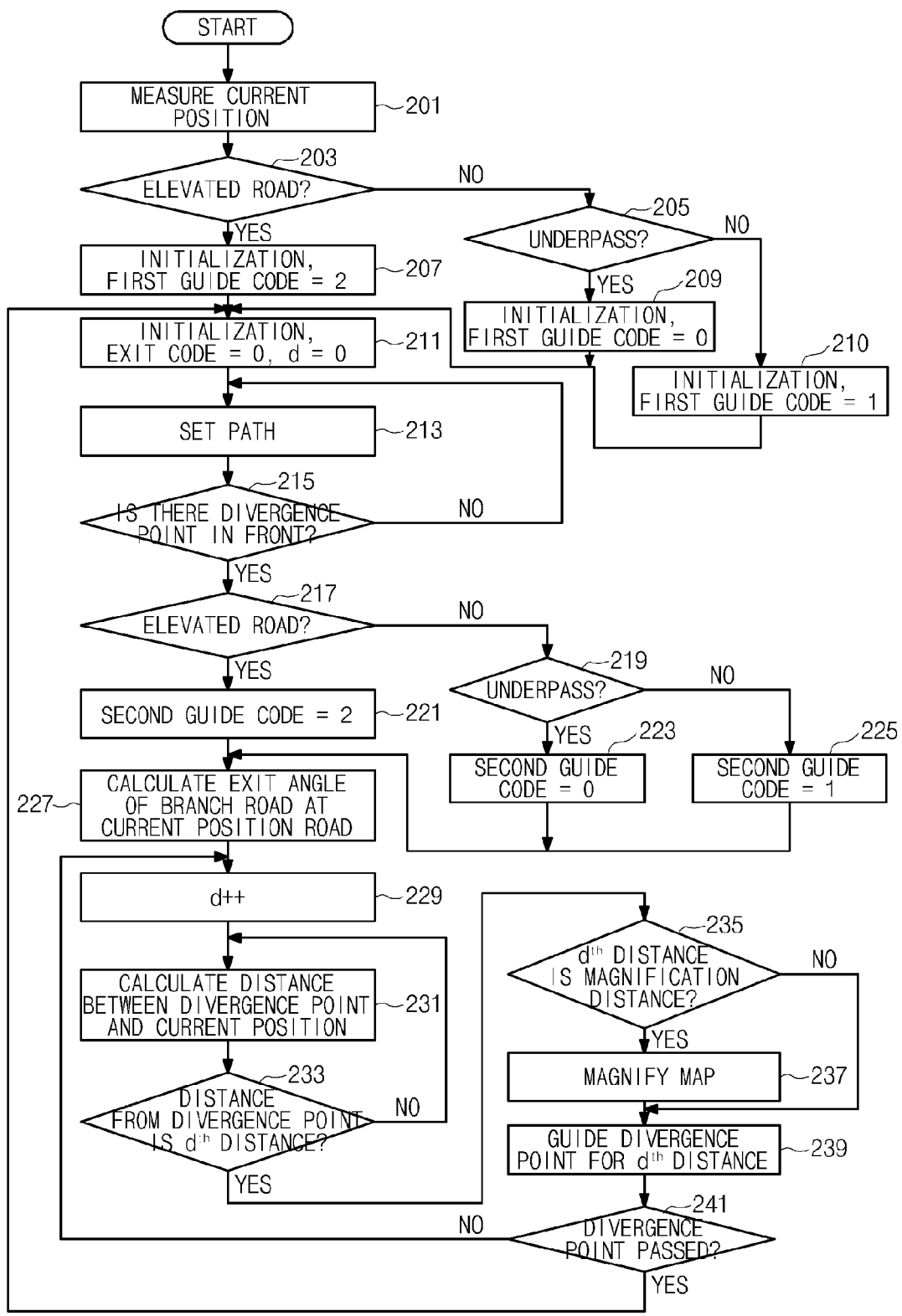
FIG. 2 is a flowchart illustrating a method for path guidance based on a road in a navigation system according to an exemplary embodiment of the present invention.
Figure 3:
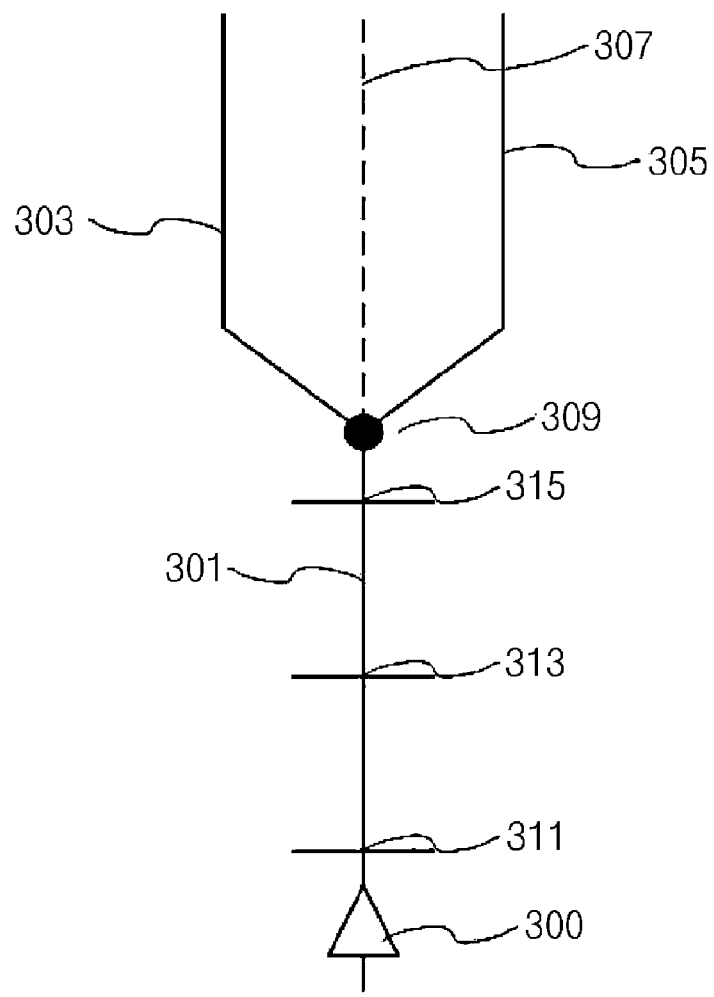
FIG. 3 is a diagram illustrating a concept of path guidance based on a road according to an exemplary embodiment of the present invention.

FIG. 2 is a flowchart illustrating a method for the path guidance based on the road in the navigation system according to an exemplary embodiment of the present invention. FIG. 3 is a diagram illustrating a concept of the path guidance based on the road according to an exemplary embodiment of the present invention. A description will be made with reference to FIGS. 1 to 3 below. In FIG. 3, reference numeral 300 denotes the current position, reference numeral 301 denotes the running road, reference numeral 311 denotes a first guide distance point, reference numeral 313 denotes a second guide distance point, reference numeral 315 denotes a third guide distance point, reference numeral 309 denotes the divergence point, reference numerals 303 and 305 denote the surface roads, and reference numeral 307 denotes the elevated road.

When a power source is supplied, in Step 201, the controller 10 measures the current position using the GPS module 60, maps the measured current position to the map data of the map DB 30, and displays the mapped position on the display unit 50.

After the Step 201, the controller 10 determines whether the road of the current position is the elevated road or the underpass in Steps 203 and 205.

When it is determined to be the elevated road, the controller 10 initializes a first road guide code by "2", and stores the initialized guide code in a road guide code stack of the storage unit 20 in Step 207. When it is determined to be the underpass, the controller 10 initializes the first road guide code by "0", and stores the initialized guide code in the road guide code stack in Step 209. When it is determined to be neither the elevated road nor the underpass, the controller 10 initializes the first road guide code by "1", and stores the initialized guide code in the road guide code stack in Step 210.

When the road guide code based on the measured position is initialized as above, the controller 10 initializes the exit code and the distance (d), which is a guide point, in Step 211. The exit code is to represent the direction of 360° by twelve directions. The exit code is decided on the basis of the current running road. The distance (d) refers to a distance of the guide point from the divergence point, for guiding, upon detection, the branch road. In the present invention, a first guide distance is 700 meters, a second guide distance is 300 meters, and a third guide distance is 150 meters.

After the Step 211, in Step 213, the controller 10 receives a destination from the user through the input unit 40, and sets the path from the current position to the destination.

Setting the path, in Step 215, the controller 10 checks whether or not there is the branch road in front within a predetermined distance from the road of the current position on the path with reference to the map data. It is desirable that the predetermined distance is set farther than the first distance. Existence and absence of the branch road can be recognized by checking the divergence point 309 of FIG. 3.

When it is checked that there is the branch road, the controller 10 checks whether the path is on the elevated road or the underpass in Steps 217 and 219.

When it is checked to be on the elevated road in the Step 217, the controller 10 sets the second road guide code to "2" and pushes the second road guide code to the road guide code stack of the storage unit 20 in Step 221. When it is checked to be on the underpass in the Step 217, the controller 10 sets the second road guide code to "0" and pushes the second road guide code to the road guide code stack. When it is checked to be on neither the elevated road nor the underpass, the controller 10 determines that the path is on the surface road, sets the second road guide code to "1", and stores the second road guide code in the road guide code stack. When the first road guide code is equal to "1" and the second road guide code is equal to "2", the current running road is the surface road and thus, a guide for entry from the surface road to the elevated road is performed. When the first road guide code is equal to "2" and the second road guide code is equal to "1", a guide for entry from the elevated road to the surface road is performed. In detail, when a car enters the elevated road out of the surface road, a value of "1-2" is stored in the road guide code stack. When the car enters the surface road out of the elevated road, the second road guide code 2 is popped up. When the car enters another second elevated road out of a first elevated road, the road guide code stack is kept having the value of "1-2". In other words, when the car enters the same road, the road guide code stack is kept as it is.

After the setting of the road guide code, in Step 227, the controller 10 calculates the exit code between the road of the current position and the branch road on the path, that is, between the roads of the first road guide code and the second road guide code, using the map DB 30. The exit code can be calculated with reference to the exit angle between the roads of the divergence point of the map DB 30. The road guide code is stored in a corresponding region of the storage unit 20, and the exit code for the branch road is set.

After the setting of the exit code, the controller 10 increases the distance (d) by "1" in Step 229, and calculates the distance from the current position to the divergence point of the branch road with reference to the map data of the map DB 30 in Step 231.

After the calculating of the distance, the controller 10 determines whether or not the calculated distance is equal to a $d^{th}$ guide distance in Step 233. In other words, the controller 10 checks whether or not, when "d" is equal to 1, the calculated distance is equal to the first guide distance (700 m), which is an initial branch road guide point.

When the calculated distance is determined to be equal to the $d^{th}$ guide distance, the controller 10 determines whether or not the $d^{th}$ guide distance is equal to a magnification distance in Step 235. In the present invention, the magnification distance is set to the second guide distance (300 m).

When the $d^{th}$ guide distance is determined not to be the magnification distance, the controller 10 proceeds with Step 239. When it is determined to be the magnification distance, the controller 10 proceeds with Step 237.

In the Step 237, the controller 10 magnifies the map displayed on the screen so that the user can well see an access road to the branch road.

When it is determined not to be the magnification distance, that is, when it is determined to be farther than the magnification distance (300 m), in the Step 239, the controller 10 performs a divergence point guide for the $d^{th}$ guide distance on the basis of the running road according to the present invention. For example, in case where the path is determined to be on the elevated road (guide code=2) from the surface road (guide code=1) in the Step 217, and the exit code calculated in the Step 227 is equal to "1", and the "d" is equal to "1", the controller 10 reads the road guidance voice data, such as "Enter [guide code] in direction of [exit code] at [d] meters in front", previously stored in the storage unit 20, combines and synthesizes, by voice, the voice data associated with each of the [guide code], the [exit code], and the [d] in the voice processor 70, and outputs a voice of "Enter elevated road in direction of 1 o'clock at 700 meters in front" through the speaker (SP).

After the branch road voice guidance, the controller 10 checks whether or not it passes through the divergence point 309 of the branch road in Step 241. When it is checked to pass through the divergence point 309, the controller 10 returns to the Step 211 and repeatedly performs its subsequent steps.

On contrary, when it is checked not to pass through the divergence point 309, the controller 10 returns to the Step 229 and repeatedly performs its subsequent steps.

In other words, the Steps 229 to 241 are to perform the branch road guidance associated with the corresponding distances at the first guide distance point 311, the second guide distance point 313, and the third guide distance point 315 of FIG. 3. The map is magnified by the preset magnification and displayed on the display unit 50 so that the user can clearly see the branch road from the second guide distance point 313 of FIG. 3.

As above, the running road of the initially measured position is set as the initial road guide code (first road guide code). However, the navigation system is constructed on the basis of the surface road and thus, the surface road can be set as the first road guide code, and the Step 211 and its subsequent steps without the Steps 203 to 210 can be performed.

As described above, the present invention has an advantage in that, since the voice guidance for the branch road is performed on the basis of the current running road, the driver can enter the branch road on the path without confusion in the divergence point.

Also, the present invention has an advantage in that, since the magnification is displayed from a predetermined distance before the divergence point of the branch road to clearly show the divergence point, the driver can exactly recognize the branch road to enter.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A navigation system having a function of branch road guidance based on a running road, the system comprising:
   a global positioning system (GPS) module for measuring and outputting a self position;
   a map database (DB) for storing map data comprising road information having a road guide code on a per-road basis and an exit code between adjacent roads in a divergence point of a branch road;
   a storage unit for, under a predetermined control, storing road guide codes and exit codes for the running road and the branch road, and storing road guidance voice data, voice data on the branch road, and numeric voice data;
   a voice processor for, under a predetermined control, receiving and combining the road guidance voice data, voice data on the road guide code, and the numeric voice data, generating branch road guidance voice data, synthesizing the branch road guidance voice data by voice, and outputting a branch road guide voice; and
   a controller for, upon detection of the branch road from a front road on a path at the time of path guidance, reading the road guide codes for the current running road of the measured position and the branch road, storing the read road guide codes in the storage unit, and outputting the voice data on the road guide code and the exit code, the numeric voice data, and the road guidance voice data, wherein the exit code is calculated with reference to the exit angle between the running road and the branch road at the divergence point of the map DB, wherein the storage unit additionally stores voice data for outputting, by voice, a branch road guide distance point and a branch road guide distance on a per-predetermined distance basis, and wherein the controller measures a distance between the current position and the divergence point where divergence to the branch road is performed, and, when the measured distance is equal to the branch road guide distance point stored in the storage unit, additionally outputs voice data associated with the branch road guide distance point to the voice processor, thereby outputting the branch road guide voice comprising the distance to the branch road.

2. The system according to claim 1, wherein the exit code is expressed using twelve directions distributed over 360 degrees on the basis of the current running road.

3. A method for branch road guidance based on a running road in a navigation system, the method comprising steps of:
    measuring a current position, and mapping and displaying the measured position;
    storing a first road guide code for the running road of the measured current position;
    receiving a destination from a user, searching a path from the current position to the destination, mapping the searched path to map data, and performing guidance;
    if there is a divergence point in front at the time of road guidance based on the searched path, storing a second road guide code for a branch road that a car enters in the divergence point;
    calculating an exit code between the running road and the branch road in the divergence point; and
    guiding the branch road on the basis of the running road by the first road guide code and the second road guide code from a predetermined distance before the divergence point, wherein the exit code is calculated with reference to an exit angle between the running road and the branch road at the divergence point, wherein the exit code is expressed using twelve directions distributed over 360 degrees on the basis of the current running road, and wherein when a distance between the current position and the divergence point where divergence to the branch road is equal to the predetermined distance, a branch road guide comprising the distance to the branch road guide is outputted.

4. The method according to claim 3, wherein the first and second road guide codes are stored in a stack.

5. The method according to claim 4, wherein the second road guide code is popped up in the stack when the car comes back from the branch road of the second road guide code and enters the running road of the first road guide code.

* * * * *